(12) United States Patent
Aoki et al.

(10) Patent No.: US 6,594,005 B2
(45) Date of Patent: Jul. 15, 2003

(54) CHROMATIC DISPERSION DISTRIBUTION MEASUREMENT APPARATUS, METHOD AND STORAGE MEDIUM FOR THE SAME

(75) Inventors: Shoichi Aoki, Hamamatsu (JP); Akio Ichikawa, Hamamatsu (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/054,816

(22) Filed: Jan. 25, 2002

(65) Prior Publication Data

US 2002/0105634 A1 Aug. 8, 2002

(30) Foreign Application Priority Data

Feb. 2, 2001 (JP) ........................................ 2001-027129

(51) Int. Cl.$^7$ .............................................. G01N 21/00
(52) U.S. Cl. ...................................................... 356/73.1
(58) Field of Search ........................ 356/73.1, 72, 477, 356/365, 450, 484, 634, 481; 250/227.18, 227.23, 227.14, 227.27; 359/109–110, 124–125, 161, 158, 189, 135, 188; 219/121.62, 121.68, 121.69; 385/12, 14

(56) References Cited

U.S. PATENT DOCUMENTS 5,956,131 A     9/1999  Mamyshev et al.
6,011,615 A  *  1/2000  Mamyshev et al. ......... 356/634

FOREIGN PATENT DOCUMENTS

EP      0 819 926 A2    1/1998
JP      10-083006       3/1998

* cited by examiner

*Primary Examiner*—Tu T. Nguyen
(74) *Attorney, Agent, or Firm*—Oliff & Berridge, PLC

(57) ABSTRACT

A chromatic dispersion distribution measurement apparatus, comprises: a portion information obtaining unit for obtaining a portion information which specifies a portion of an optical device to be measured; a sign information obtaining unit for obtaining a sign information which indicates a correct sign to be marked on a chromatic dispersion value in the specified portion; and a sign converting unit for converting an initial sign marked on the chromatic dispersion value in the specified portion, into the correct sign in accordance with the sign information obtained by the sign information obtaining unit.

11 Claims, 6 Drawing Sheets

FIG.1

RELATED ART

RELATED ART

US 6,594,005 B2

CHROMATIC DISPERSION DISTRIBUTION MEASUREMENT APPARATUS, METHOD AND STORAGE MEDIUM FOR THE SAME

BACKGROUND OF THE INVENTION

1. Field of the Invention

The present invention relates to a chromatic dispersion distribution measurement apparatus (wavelength dispersion distribution measurement apparatus) for measuring a chromatic dispersion distribution (wavelength dispersion distribution) in an optical device to be measured, such as an optical fiber, and a method for the same. Moreover, the present invention relates to a storage medium for storing a program for calculating a chromatic dispersion distribution in an optical device to be measured.

2. Description of Related Art

In recent years, in order to satisfy the demands for high speed information communications, optical communication systems using optical fibers have been constructed. One of the factors in preventing the high speed signal transmission and the long transmission distance in the above optical communication systems, is the chromatic dispersion. The chromatic dispersion is a phenomenon caused by varying the speeds of lights transmitted in a medium, with the wavelength of the light. In the construction of the optical communication systems, it is necessary to grasp the chromatic dispersion characteristic in detail.

A chromatic dispersion distribution measurement apparatus for measuring the chromatic dispersion is shown in, for example, Japanese Patent Application Publication No. Tokukai-Hei 10-83006 (corresponding to the U.S. Pat. No. 5,956,131 and the European Patent Application No. 0819926A2). In the publication, the chromatic dispersion distribution measurement apparatus measures the dispersion distribution in a longitudinal direction of a fiber to be measured, as follows. Two lights having different wavelengths from each other are inputted into the fiber to be measured. A specific wavelength component is extracted by an optical bandpass filter from a four-wave mixed light caused by the interaction between these two lights. A light having the extracted specific wavelength component is inputted into an Optical Time Domain Reflectometer (OTDR).

The four-wave mixing (FWM) is a phenomenon caused by the non-linearity of a plurality of lights having different wavelengths from each other in an optical fiber. For example, when two lights have wavelengths $\lambda 1$ and $\lambda 2$ respectively, a wavelength $\lambda 3$ of a light (Stokes light) caused by this phenomenon and a wavelength $\lambda 4$ of a light (anti-Stokes light) caused by the phenomenon satisfy the following equation (1).

$$\lambda 2 - \lambda 1 = \lambda 1 - \lambda 4 = \lambda 3 - \lambda 2 \qquad (1)$$

The chromatic dispersion distributions which are measured by using the OTDR generally vary with each optical fiber to be measured. Moreover, a chromatic dispersion value is marked with a constant sign (positive (+) or negative (−) sign) (hereinbelow, referred to as "sign") in spite of wavelengths of the inputted lights. That is, the sign of a chromatic dispersion value depends on an optical fiber to be measured. By using a former chromatic dispersion distribution measurement apparatus, only an absolute value of a chromatic dispersion value can be measured. The sign of a chromatic dispersion value is judged by using another apparatus.

Figure 1:
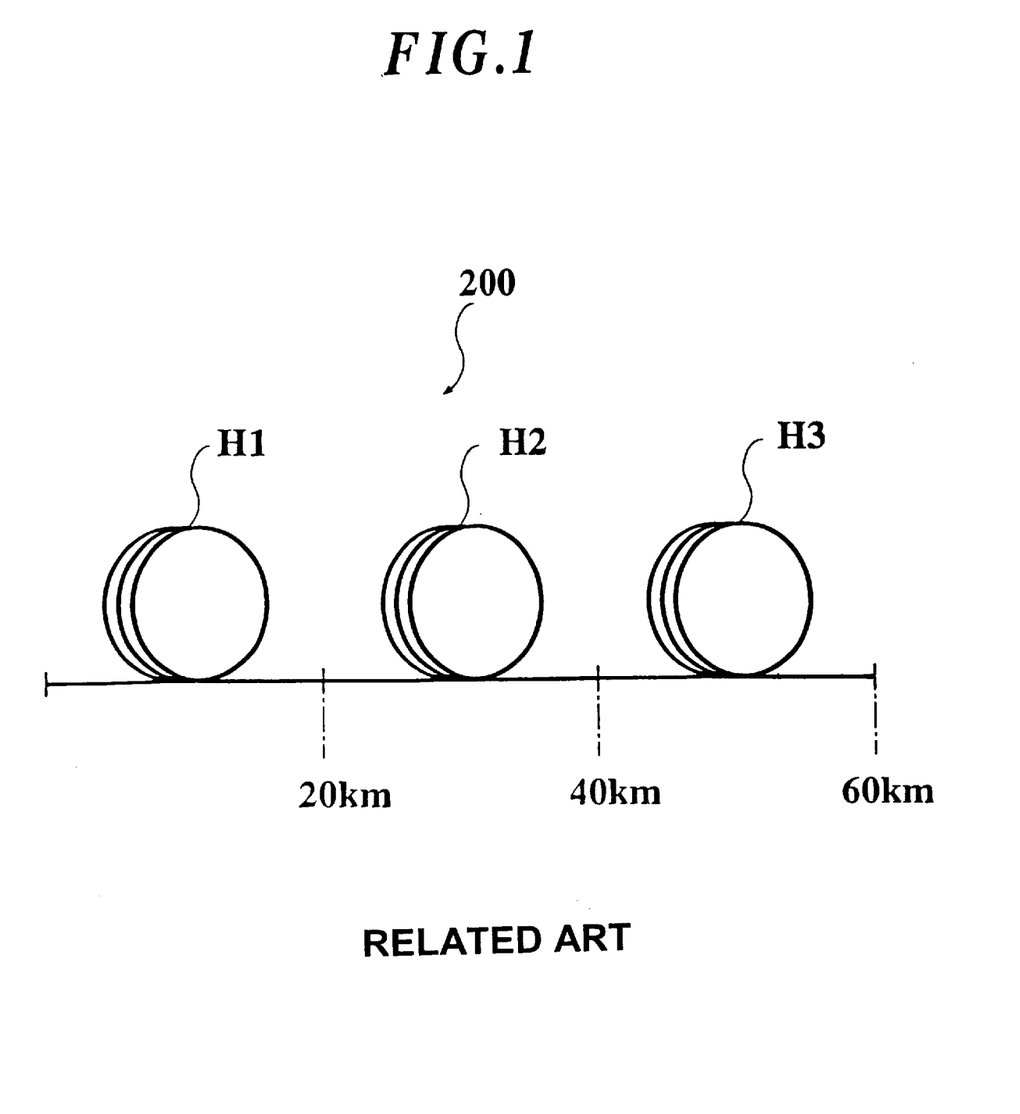
FIG. 1 is a drawing showing a schematic structure of an long distance optical cable.
Figure 7:
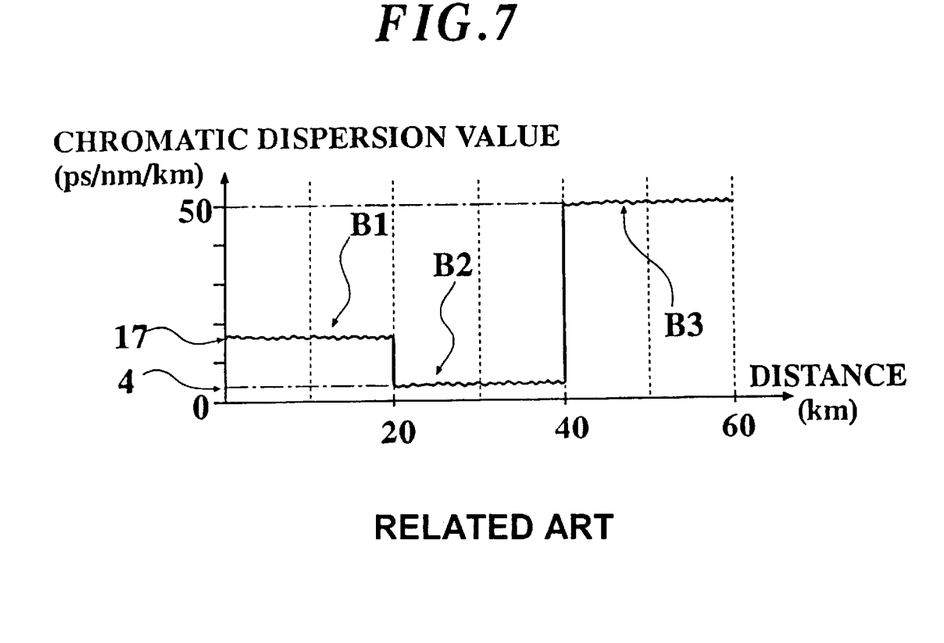
FIG. 7 shows a chromatic dispersion distribution expressed without marking the chromatic dispersion values with a positive sign or a negative sign in the long distance optical cable, which is measured by a former chromatic dispersion distribution measurement apparatus.

With reference to FIGS. 1 and 7, a chromatic dispersion distribution in a long distance optical cable, which is measured by a former chromatic dispersion distribution measurement apparatus, is explained.

FIG. 1 is a view showing a schematic structure of a long distance optical cable 200 as an optical device to be measured. FIG. 7 shows a chromatic dispersion distribution in the long distance optical cable 200, which is shown without marking each chromatic dispersion value with the sign. The chromatic dispersion distribution shown without marking each chromatic dispersion value with the sign, is measured by a chromatic dispersion distribution measurement apparatus. The chromatic dispersion distribution shown without marking each chromatic dispersion value with the sign, is also measured as an interim data by an optical fiber chromatic dispersion distribution measurement apparatus 100 to which the present invention is applied. The distribution will be explained in detail later.

The long distance optical cable 200 is constructed by jointing three optical fibers H1, H2 and H3. A range of the optical fiber H1 in the longitudinal direction of the long distance optical cable 200 is 0 to 20 km. A range of the optical fiber H2 is 20 to 40 km. A range of the optical fiber H3 is 40 to 60 km. The chromatic dispersion value marked with the sign (hereinbelow, referred to as "signed chromatic dispersion value"), of the optical fiber H1 is +17 (ps/nm/km). The signed chromatic dispersion value of the optical fiber H2 is −4 (ps/nm/km). The signed chromatic dispersion value of the optical fiber H3 is −50 (ps/nm/km).

As shown in FIG. 7, a chromatic dispersion distribution in the long distance optical cable 200, which is measured by a former chromatic dispersion distribution measurement apparatus is expressed by using each absolute value of the chromatic dispersion value of the optical fibers H1 to H3. In detail, the absolute value of the chromatic dispersion value of the optical fiber H1, which is denoted by B1 is "17 (ps/nm/km)". The absolute value of the chromatic dispersion value of the optical fiber H2, which is denoted by B2 is "4 (ps/nm/km)". The absolute value of the chromatic dispersion value of the optical fiber H3, which is denoted by B3 is "50 (ps/nm/km)".

However, there was a problem as explained below in such a former chromatic dispersion distribution measurement apparatus. The chromatic dispersion distribution in a long distance optical cable constructed by jointing a plurality of optical fibers, which is measured by a former chromatic dispersion distribution measurement apparatus, is expressed by using each absolute value of the chromatic dispersion value of the optical fiber. Moreover, each chromatic dispersion value of this chromatic dispersion distribution is outputted as a positive (+) value in spite of the optical fibers. Therefore, it is difficult to measure correctly a chromatic dispersion distribution in the long distance optical cable and an accumulated chromatic dispersion value of the long distance optical cable, in consideration of each sign of the chromatic dispersion value.

For example, when the accumulated chromatic dispersion value of the long distance optical cable 200 is calculated in accordance with the measurement result shown in FIG. 7, which is measured by a former chromatic dispersion distribution measurement apparatus, the calculating result is the sum of the products of each absolute value of the chromatic dispersion value and the length of each optical fiber. That is, the accumulated chromatic dispersion value is "17×20+4× 20+5×20=1420 (ps/nm)". However, the correct accumulated chromatic dispersion value of the long distance optical cable 200 (the sum of the products of each signed chromatic dispersion value and the length of each optical fiber) is "17×20+(−4)×20+(−50)×20=−740 (ps/nm)". Therefore, the calculated accumulated chromatic dispersion value is different from the correct accumulated chromatic dispersion value.

SUMMARY OF THE INVENTION

In order to solve the above-described problems, an object of the present invention is to provide a chromatic dispersion distribution measurement apparatus which can measure a chromatic dispersion value marked with a positive sign or a negative sign, and to provide a measurement method which can measure a chromatic dispersion value marked with a positive sign or a negative sign. Moreover, another object is to provide a storage medium storing a program which can calculate a chromatic dispersion value marked with a positive sign or a negative.

That is, in accordance with a first aspect of the present invention, a chromatic dispersion distribution measurement apparatus for measuring a chromatic dispersion distribution in an optical device to be measured, comprises:

two light sources for emitting two lights having different wavelengths from each other;

an intensity measurement unit for measuring an intensity of a four-wave mixing light outputted from the optical device to be measured, as a function of a transmission distance of the four-wave mixing light, when the two lights are simultaneously inputted into the optical device to be measured;

a calculating unit for calculating a chromatic dispersion distribution in the optical device to be measured, in accordance with the intensity of the four-wave mixing light as the function of the transmission distance, which is measured by the intensity measurement unit;

a portion specifying unit for specifying a portion of the optical device to be measured in a longitudinal direction thereof;

a sign setting unit for setting a correct sign selected out of a positive sign and a negative sign, which is to be marked on a chromatic dispersion value in the specified portion of the optical device to be measured; and a sign converting unit for converting an initial sign marked on the chromatic dispersion value in the specified portion, which is extracted from the chromatic dispersion distribution calculated by the calculating unit, into the correct sign which is set by the sign setting unit.

In accordance with a second aspect of the present invention, a chromatic dispersion distribution measurement method for measuring a chromatic dispersion distribution in an optical device to be measured, comprises:

emitting two lights which have different wavelengths from each other;

measuring an intensity of a four-wave mixing light outputted from the optical device to be measured, as a function of a transmission distance of the four-wave mixing light, when the two lights are simultaneously inputted into the optical device to be measured;

calculating a chromatic dispersion distribution in the optical device to be measured, in accordance with the measured intensity of the four-wave mixing light as the function of the transmission distance;

specifying a portion of the optical device to be measured in a longitudinal direction thereof;

setting a correct sign selected out of a positive sign and a negative sign, which is to be marked on a chromatic dispersion value in the specified portion of the optical device to be measured; and converting an initial sign which is marked on the chromatic dispersion value in the specified portion, which is extracted from the calculated chromatic dispersion distribution, into the set correct sign.

Hereinafter, the term "sign" generally means one of a positive sign and a negative sign. Moreover, the initial sign of an absolute value is treated as a positive sign.

According to the first and second aspects of the present invention, in the case that the optical device to be measured is constructed by jointing a plurality of optical device portions having chromatic dispersion values which are different from each other, when the correct sign to be marked on each chromatic dispersion value of the optical device portions and each joint position of the optical device portions are known to an operator, the chromatic dispersion value marked with the correct sign, of the optional optical device portion constituting the optical device to be measured, can be easily calculated without individually measuring each chromatic dispersion value of the optical device portions. Therefore, the chromatic dispersion distribution measurement apparatus and method having the enhanced functionality and convenience, can be realized.

The calculating unit may calculate a signed chromatic dispersion distribution expressed by marking each chromatic dispersion value with the correct sign, in the optical device to be measured, in accordance with the chromatic dispersion value which is marked with the correct sign into witch the initial sign is converted by the sign converting unit.

The calculating may be carried out by calculating a signed chromatic dispersion distribution expressed by marking each chromatic dispersion value with the correct sign, in the optical device to be measured, in accordance with the chromatic dispersion value which is marked with the correct sign.

Hereinafter, the signed chromatic dispersion distribution is the chromatic dispersion distribution expressed by marking each chromatic dispersion value with the correct sign.

In the case that the optical device to be measured is constructed by jointing a plurality of optical device portions having chromatic dispersion values which are different from each other, when the correct sign to be marked on each chromatic dispersion value of the optical device portions and each joint position of the optical device portions are known to the operator, the signed chromatic dispersion distribution in the optical device to be measured, on which the sign of the chromatic dispersion value of each optical device portion is correctly reflected, can be easily calculated. Therefore, the chromatic dispersion distribution measurement apparatus and method having the much enhanced functionality and convenience, can be realized.

The calculating unit may calculate an accumulated chromatic dispersion value of the optical device to be measured, in accordance with the calculated signed chromatic dispersion distribution.

The calculating may be carried out by calculating an accumulated chromatic dispersion value of the optical device to be measured, in accordance with the calculated signed chromatic dispersion distribution.

Therefore, in the case that the optical device to be measured is constructed by jointing a plurality of optical device portions having chromatic dispersion values which are different from each other, when the correct sign to be marked on each chromatic dispersion value of the optical device portions and each joint position of the optical device portions are known to the operator, the correct accumulated chromatic dispersion value of the optical device to be measured, can be easily calculated without individually measuring each chromatic dispersion value of the optical device portions. Therefore, the chromatic dispersion distribution measurement apparatus and method having the enhanced functionality and convenience, can be realized. Further, an optical cable which enables a long distance communication can be easily constructed by suitably combining and jointing optical device portions having chromatic dispersion values which are different from each other.

The chromatic dispersion distribution measurement apparatus may further comprise:

a directional coupler unit for outputting the two lights to the optical device to be measured, and for outputting a reflected four-wave mixing light which is reflected from the optical device to be measured, to the intensity measurement unit; wherein the intensity measurement unit measures the intensity of the reflected four-wave mixing light as the function of the transmission distance.

In accordance with a third aspect of the present invention, a chromatic dispersion distribution measurement apparatus, comprises:

a portion information obtaining unit for obtaining a portion information which specifies a portion of an optical device to be measured;

a sign information obtaining unit for obtaining a sign information which indicates a correct sign to be marked on a chromatic dispersion value in the specified portion; and a sign converting unit for converting an initial sign marked on the chromatic dispersion value in the specified portion, into the correct sign in accordance with the sign information obtained by the sign information obtaining unit.

The chromatic dispersion distribution measurement apparatus may further comprise: a calculating unit for calculating a signed chromatic dispersion distribution expressed by marking each chromatic dispersion value with the correct sign, in the optical device to be measured, in accordance with the chromatic dispersion value marked with the correct sign into which the initial sign is converted by the sign converting unit.

The calculating unit may calculate an accumulated chromatic dispersion value of the optical device to be measured, in accordance with the calculated signed chromatic dispersion distribution.

In accordance with a fourth aspect of the present invention, a chromatic dispersion distribution measurement method, comprises:

obtaining a portion information which specifies a portion of an optical device to be measured;

obtaining a sign information which indicates a correct sign to be marked on a chromatic dispersion value in the specified portion; and converting an initial sign marked on the chromatic dispersion value in the specified portion, into the correct sign in accordance with the obtained sign information.

The chromatic dispersion distribution measurement method may further comprise: calculating a signed chromatic dispersion distribution expressed by marking each chromatic dispersion value with the correct sign, in the optical device to be measured, in accordance with the chromatic dispersion value marked with the correct sign.

The chromatic dispersion distribution measurement method may further comprise: calculating an accumulated chromatic dispersion value of the optical device to be measured, in accordance with the calculated signed chromatic dispersion distribution.

In accordance with a fifth aspect of the present invention, a storage medium has a program recorded thereon, which is executable by a computer, wherein the program comprises:

a first program code for obtaining a portion information which specifies a portion of an optical device to be measured;

a second program code for obtaining a sign information which indicates a correct sign to be marked on a chromatic dispersion value in the specified portion; and a third program code for converting an initial sign marked on the chromatic dispersion value in the specified portion, into the correct sign in accordance with the obtained sign information.

The program may further comprise: a fourth program code for calculating a signed chromatic dispersion distribution expressed by marking each chromatic dispersion value with the correct sign, in the optical device to be measured, in accordance with the chromatic dispersion value marked with the correct sign.

The program may further comprise: a fifth program code for calculating an accumulated chromatic dispersion value of the optical device to be measured, in accordance with the calculated signed chromatic dispersion distribution.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinafter, an embodiment of the present invention will be explained in detail with reference to the drawings.

Firstly, the structure of the embodiment will be explained.

Figure 2:
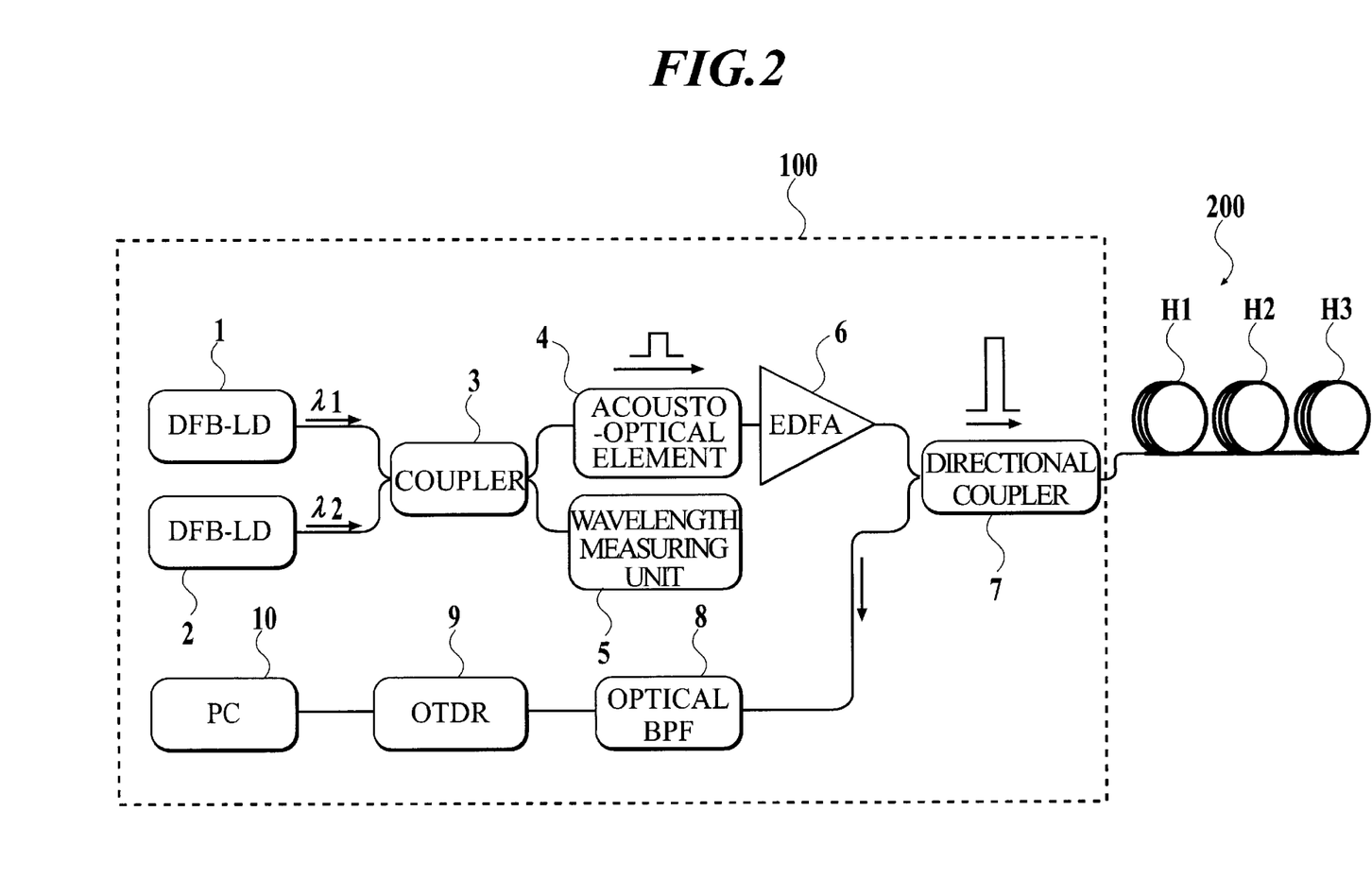
FIG. 2 is a block diagram showing a structure of an optical fiber chromatic dispersion distribution measurement apparatus to which the present invention is applied.

FIG. 2 is a block diagram showing the structure of the optical fiber chromatic dispersion distribution measurement apparatus 100 to which the present invention is applied.

In FIG. 2, the optical fiber chromatic dispersion distribution measurement apparatus 100 comprises two distributed feedback-laser diodes (DFB-LD) 1 and 2, a coupler 3, an acousto-optical element 4, a wavelength measuring unit 5, an erbium-doped fiber amplifier (EDFA) 6, a directional coupler 7, an optical bandpass filter (BPF) 8, an optical time domain reflectometer (OTDR) 9, a personal computer (PC) 10 and the like. A long distance optical cable 200 which is shown in FIG. 1 is connected with the optical fiber chromatic dispersion distribution measurement apparatus 100.

The DFB-LDs 1 and 2 are light sources. The DFB-LD 1 outputs a light having a wavelength $\lambda 1$. The DFB-LD 2 outputs a light having a wavelength $\lambda 2$ which is not equal to $\lambda 1$. These two lights outputted from the DFB-LD 1 and 2 are inputted into the coupler (coupler unit) 3.

The coupler 3 couples the light having the wavelength $\lambda 1$, which is outputted from the DFB-LDs 1 and the light having the wavelength $\lambda 2$, which is outputted from the DFB-LDs 2. Then the coupler 3 outputs the coupled light to the acousto-optical element 4 and the wavelength measuring unit 5 which are arranged on the subsequent stage.

The acousto-optical element 4 shapes a waveform of the coupled light outputted from the coupler 3, into a pulse form. Then, the acousto-optical element 4 outputs the shaped pulse light to the EDFA 6.

The wavelength measuring unit 5 monitors the waveform of the coupled light outputted from the coupler 3.

The EDFA 6 amplifies the pulse light outputted from the acousto-optical element 4. Then, the EDFA 6 outputs the amplified pulse light to the directional coupler 7.

The directional coupler 7 outputs the pulse light amplified by the EDFA 6 to the long distance optical cable 200. In addition, the directional coupler 7 outputs all of the reflected lights including the FWM light, which are outputted from the long distance optical cable 200, to the optical BPF 8.

The optical BPF 8 passes only a light having a specific wavelength (in this embodiment, one of the Stokes light and the anti-Stokes light) out of all of the reflected lights outputted from the long distance optical cable 200, and outputs the passed light to the OTDR 9.

Figure 3:
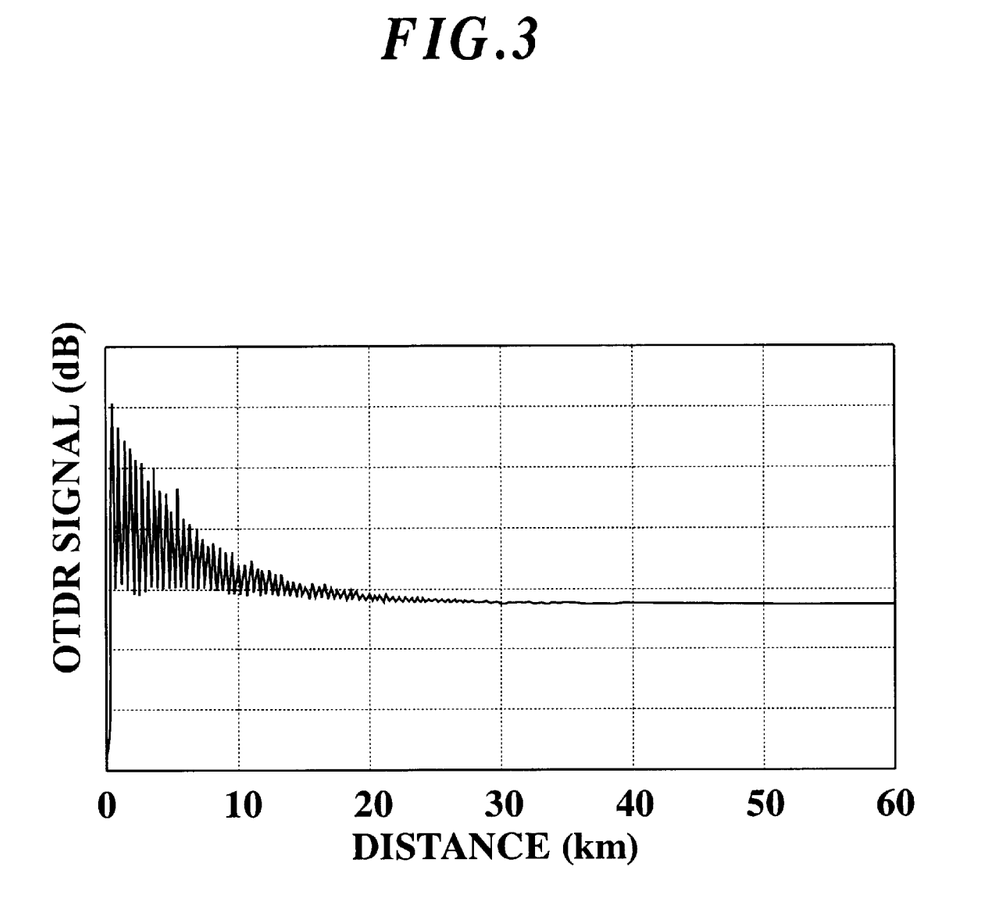
FIG. 3 shows an intensity distribution of a FWM light (a light passed through the optical BPF), which is outputted from the OTDR shown in FIG. 2.

In accordance with the passed light (the Stokes light or the anti-Stokes light) from the optical BPF 8, the OTDR 9 measures the intensity distribution of the passed light (the FWM light) or the loss distribution for the light inputted into the long distance optical cable 200. In this embodiment, the OTDR 9 measures the intensity distribution of an FWM light, which is shown in FIG. 3.

The PC 10 executes each type of operating process related to the data outputted from the OTDR 9. In particular, the PC 10 calculates a chromatic dispersion distribution in the long distance optical cable 200 in accordance with the intensity distribution data of the FWM light, which is outputted from the OTDR 9.

Moreover, each position of the optical fibers H1 to H3 constituting the long distance optical cable 200 and the sign, that is, a positive sign or a negative sign, to be marked on each chromatic dispersion value of the optical fibers H1 to H3 are previously inputted into the PC 10 by an operator. The PC 10 calculates each chromatic dispersion value marked with the sign (hereinbelow, referred to as "signed chromatic dispersion value"), of the optical fibers H1 to H3 in accordance with the inputted position, the inputted sign and the calculated chromatic dispersion distribution in the long distance optical cable 200. That is, the PC 10 extracts each chromatic dispersion value of the optical fibers H1 to H3 from the chromatic dispersion distribution in the long distance optical cable 200. Then, out of the extracted chromatic dispersion values, the PC 10 converts the absolute value of the chromatic dispersion value which is actually negative (−), into a negative value.

Furthermore, the PC 10 outputs the signed chromatic dispersion distribution expressed by marking each chromatic dispersion value with a positive sign or a negative sign (hereinbelow, referred to as "signed chromatic dispersion distribution"), in the long distance optical cable 200, to a display device (which is not shown in the drawings). Moreover, the PC 10 calculates an accumulated chromatic dispersion value of the long distance optical cable 200 in accordance with the signed chromatic dispersion distribution which are calculated. Then, the PC 10 outputs the accumulated chromatic dispersion value to the display device.

When two lights having different wavelengths from each other which are outputted from the DFB-LDs 1 and 2, are supplied to the long distance optical cable 200 through the directional coupler 7, the long distance optical cable 200 generates an FWM light by the interaction between these two lights.

Next, the operation of the embodiment will be explained.

Figure 4:
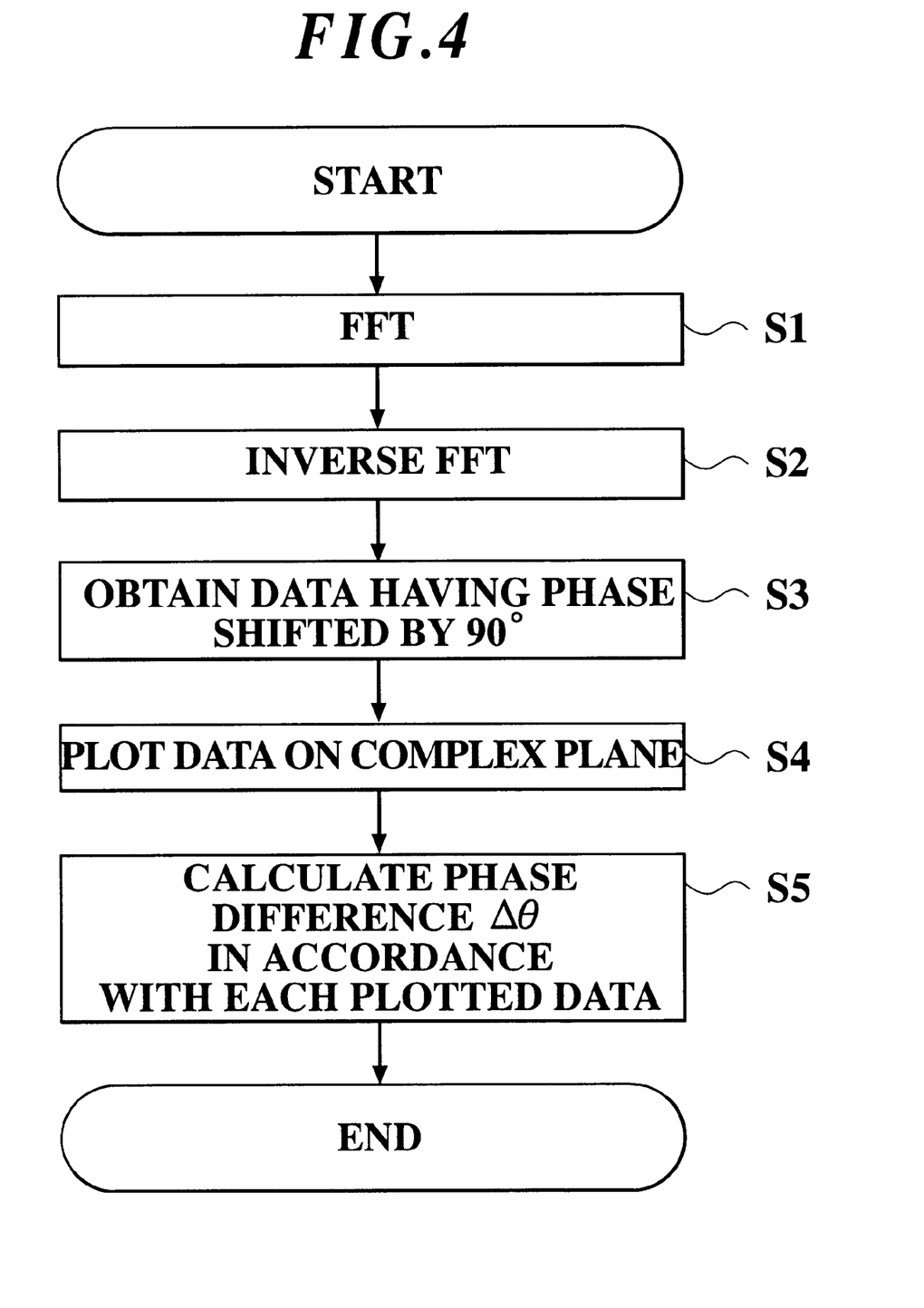
FIG. 4 shows a flowchart for explaining a calculation process for calculating a chromatic dispersion distribution in the long distance optical cable by the optical fiber chromatic dispersion distribution measurement apparatus according to the present invention.

With reference to FIGS. 3 and 4, a calculation process for calculating a chromatic dispersion distribution in the long distance optical cable 200, in accordance with a waveform data of the FWM light outputted from the OTDR 9, will be explained. FIG. 3 shows an intensity distribution of the FWM light (the light passed through the optical BPF 8), which is outputted from the OTDR 9. FIG. 4 shows a flowchart for explaining the calculation process for calculating a chromatic dispersion distribution in the long distance optical cable 200, which is carried out in the optical fiber chromatic dispersion distribution measurement apparatus 100.

In FIG. 3, an abscissa axis represents a transmission distance of the FWM light transmitted in the long distance optical cable 200. An ordinate axis represents the intensity of the FWM light (the light passed through the optical BPF 8).

As shown in FIG. 3, the intensity distribution data of the FWM light outputted from the OTDR 9 to the PC 10 shows the intensity of the FWM light transmitted from each point of the long distance optical cable 200, as a function of the transmission distance. The intensity cyclically varies with the transmission distance, that is, the intensity oscillates. Therefore, the transmission distance corresponds to the phase $\theta(\lambda)$ in the cyclic variation (oscillation) of the intensity distribution.

The PC 10 executes the fast Fourier transform (FFT) of the intensity distribution data of the FWM light outputted from the OTDR 9, in order to calculate the data expressed by a frequency spectrum (Step S1). Next, in a plurality of data expressed by the frequency spectrum, the PC 10 executes the inverse Fourier transform (inverse FFT) of only the data at positive frequencies (Step S2). Then, the PC 10 calculates the data having the phase shifted by 90° from the original intensity distribution data of the FWM light (Step S3).

The PC 10 plots the data obtained in the Step S3 on a complex plane (Step S4). Then, each phase difference $\Delta\theta(\lambda)$ between two adjacent plotted data is calculated (Step S5). Each chromatic dispersion value is calculated in accordance with the calculated phase difference $\Delta\theta(\lambda)$. The calculated chromatic dispersion values are absolute values, that is, positive values data.

Next, a sign conversion process for converting the sign of the chromatic dispersion value in the chromatic dispersion distribution, will be explained with reference to the FIGS. 5 to 7.

Figure 5:
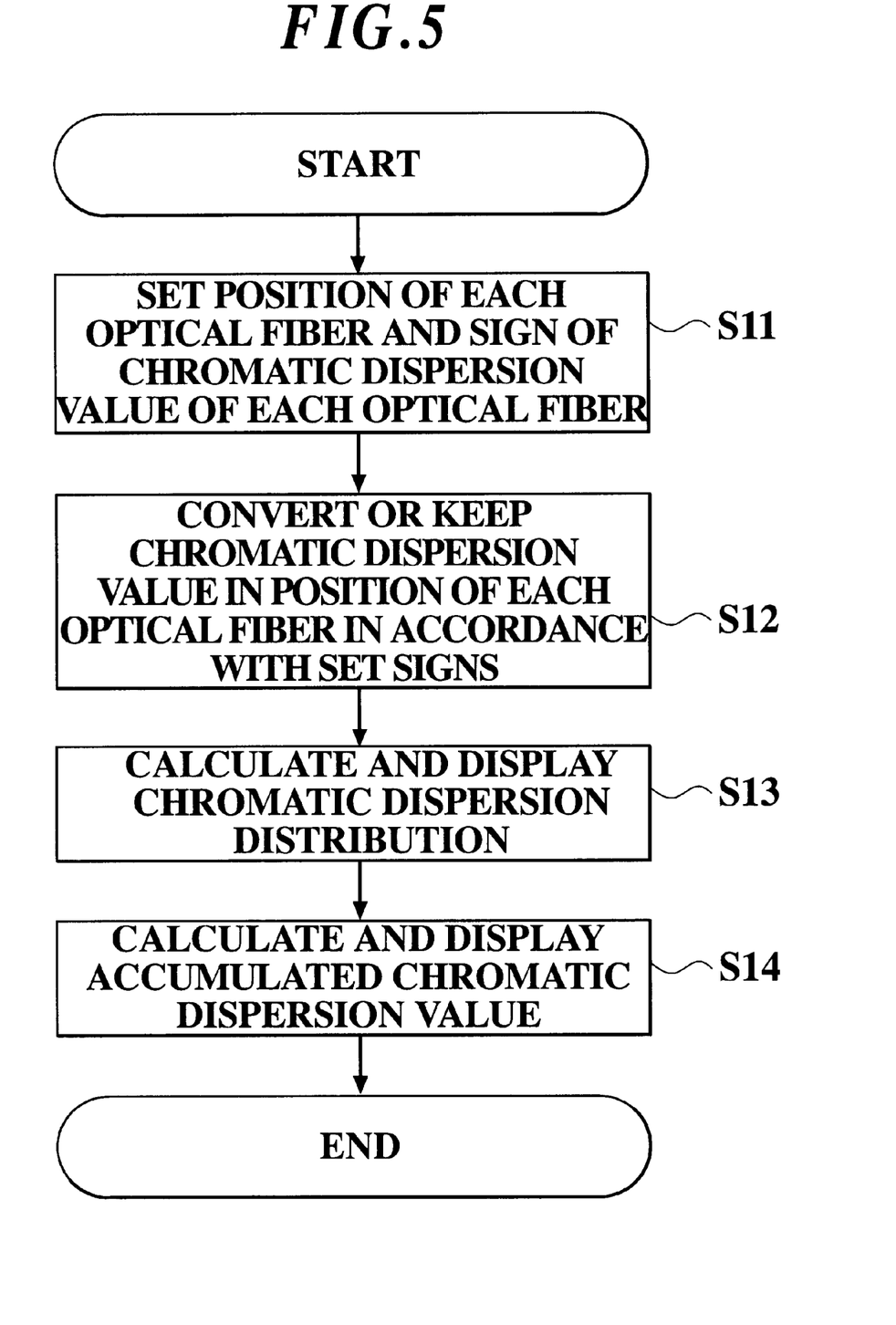
FIG. 5 shows a flowchart for explaining a calculation process for calculating a chromatic dispersion distribution expressed by marking the chromatic dispersion value with a positive sign or a negative sign and an accumulated chromatic dispersion value, by the optical fiber chromatic dispersion distribution measurement apparatus to which the present invention is applied.
Figure 6:
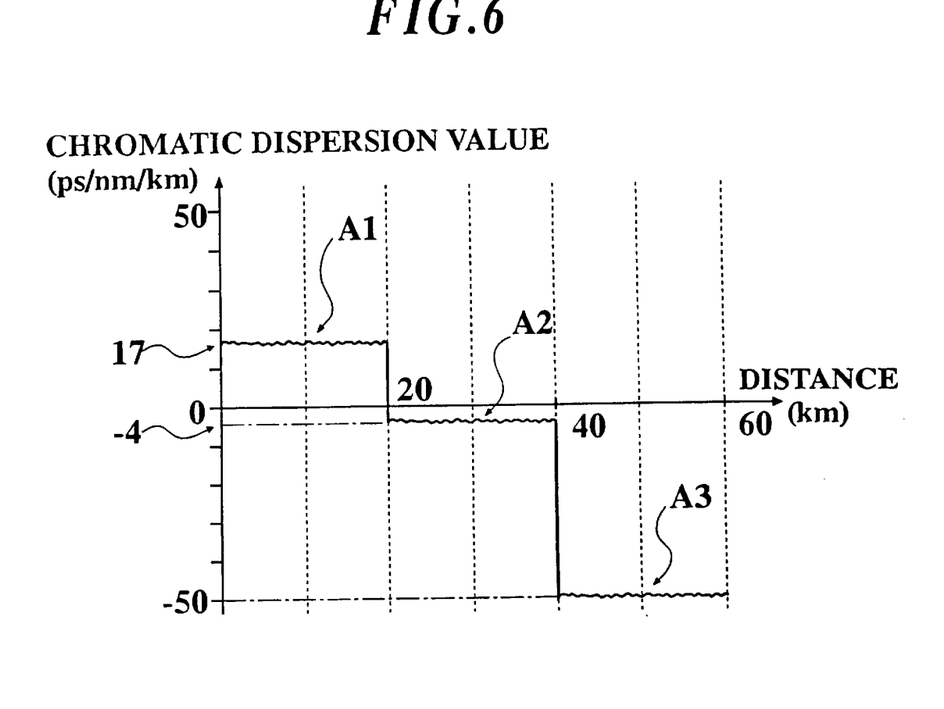
FIG. 6 shows a chromatic dispersion distribution expressed by marking each chromatic dispersion value with a positive sign or a negative sign in the long distance optical cable, which is measured by the optical fiber chromatic dispersion distribution measurement apparatus to which the present invention is applied.

FIG. 5 is a flowchart for explaining the calculation process for calculating the signed chromatic dispersion distribution and the accumulated chromatic dispersion value, which is carried out by the optical fiber chromatic dispersion distribution measurement apparatus 100. FIG. 6 shows the signed chromatic dispersion distribution in the long distance optical cable 200, which is measured by the optical fiber chromatic dispersion distribution measurement apparatus 100.

At first, each position of the optical fibers H1 to H3 which constitute the long distance optical cable 200, and the sign to be marked on each chromatic dispersion value of the optical fibers H1 to H3 are set by an operator (Step S11). Then, the PC 10 extracts the chromatic dispersion value in each position of the optical fibers H1 to H3 from the chromatic dispersion distribution data in the long distance optical cable 200, which are already calculated (see the chromatic dispersion distribution shown without marking each chromatic dispersion value with the sign, in the long distance optical cable 200, which is shown in FIG. 7).

Here, the position of the optical fiber H1 in the longitudinal direction of the long distance optical cable 200 is "0 to 20 km". The sign of the chromatic dispersion value of the optical fiber H1 is "positive (+)". The position of the optical fiber H2 is "20 to 40 km". The sign of the chromatic dispersion value of the optical fiber H2 is "negative (−)". The position of the optical fiber H3 is "40 to 60 km". The sign of the chromatic dispersion value of the optical fiber H3 is "negative (−)".

That is, the PC 10 extracts the absolute value of the chromatic dispersion value "17 (ps/nm/km)" in the position of the optical fiber H1 (0 to 20 km) from the chromatic dispersion distribution data in the long distance optical cable 200, which is shown in FIG. 7. Moreover, the PC 10 extracts the absolute value of the chromatic dispersion value "4 (ps/nm/km)" in the position of the optical fiber H2 (20 to 40 km) from the chromatic dispersion distribution data. Moreover, the PC 10 extracts the absolute value of the chromatic dispersion value "50 (ps/nm/km)" in the position of the optical fiber H3 (40 to 60 km) from the chromatic dispersion distribution data.

Then, the PC 10 converts or keeps the sign which is marked on each extracted absolute value "17 (ps/nm/km)", "4 (ps/nm/km)" and "50 (ps/nm/km)" in the positions of the optical fibers H1 to H3 in accordance with each sign of the chromatic dispersion value, which is set in the Step S11 (Step S12).

That is, the PC 10 converts the chromatic dispersion value in the position of the optical fiber H2 into "−4 (ps/nm/km)". Moreover, the PC 10 converts the chromatic dispersion value in the position of the optical fiber H3 into "−50 (ps/nm/km)". At the same time, the PC 10 keeps the chromatic dispersion value "17 (ps/nm/km)" of the optical fiber H1.

Then, the PC 10 calculates the signed chromatic dispersion distribution in the long distance optical cable 200 in accordance with the chromatic dispersion values which are calculated in the Step S12. In addition, the PC 10 outputs the calculated data to a display device (which is not shown in the drawings) (Step S13). The calculated signed chromatic dispersion distribution is shown in FIG. 6. In FIG. 6, three data which are denoted by the reference marks A1 to A3 are the signed chromatic dispersion values of the optical fibers H1 to H3 respectively.

Then, the PC 10 calculates the accumulated chromatic dispersion value of the long distance optical cable 200 in accordance with the chromatic dispersion values calculated in the Step S12. In addition, the PC 10 outputs the calculated accumulated dispersion value data to the display device (Step S14). Here, the accumulated chromatic dispersion value of the long distance optical cable 200 is the sum of the products of each signed chromatic dispersion value and the length of each optical fibers H1 to H3, that is, "17×20+(−4)×20+(−50)×20=−740 (ps/nm)".

As mentioned above, in accordance with the optical fiber chromatic dispersion distribution measurement apparatus 100 to which the present invention is applied, the chromatic dispersion distribution which is expressed without marking each chromatic dispersion value with the sign, in the long distance optical cable 200 is calculated. Then, when each range of the chromatic dispersion distribution data and each sign to be marked on the chromatic dispersion value in each range are specified, it can be judged whether each sign of the chromatic dispersion value in the specified range should be converted into the opposite sign.

Therefore, in the case that a long distance optical cable is constructed by jointing a plurality of optical fibers having chromatic dispersion values which are different from each other, when a chromatic dispersion distribution and an accumulated chromatic dispersion value of this long distance optical cable are to be measured, the signed chromatic dispersion distribution on which the sign of the chromatic dispersion value of each optical fiber is reflected, can be measured. Moreover, even in the long distance optical cable in which one or more chromatic dispersion values marked with a positive sign and one or more chromatic dispersion values marked with a negative sign are mixed, a correct chromatic dispersion distribution data and a correct accumulated chromatic dispersion value can be measured. Therefore, the functionality of the optical fiber chromatic dispersion distribution measurement apparatus can be enhanced.

Moreover, the optical fiber chromatic dispersion distribution measurement apparatus 100 can calculate a correct accumulated chromatic dispersion value of an optical cable. Therefore, an optical cable which enables a long distance communication can be easily constructed by suitably combining and jointing optical fibers having chromatic dispersion values which are different from each other.

The present invention is not limited to this embodiment. Thus, various other changes may be suitably made without departing from the gist of the present invention. For example, although the long distance optical cable 200 which is constructed by jointing the optical fibers H1 to H3, is explained as an optical device to be measured, the present invention may be applied to an optional long distance optical cable.

Moreover, in the embodiment, it is explained that the information about each position of the optical fibers H1 to H3 which constitute the long distance optical cable 200, is set by an operator. However, the above information may be set by another apparatus for specifying each position of the optical fibers H1 to H3 in the long distance optical cable 200.

Furthermore, in the embodiment, it is explained that the information about the sign of each chromatic dispersion value of the optical fibers H1 to H3, is set by an operator. However, the above information may be set by another apparatus for judging the sign of each chromatic dispersion value of the optical fibers H1 to H3.

The entire disclosure of Japanese Patent Application No. Tokugan 2001-27129 filed on Feb. 2, 2001 including specification, claims drawings and summary are incorporated herein by reference in its entirety.

What is claimed is:

1. A chromatic dispersion distribution measurement apparatus for measuring a chromatic dispersion distribution in an optical device to be measured, comprising:

two light sources for emitting two lights having different wavelengths from each other;

an intensity measurement unit for measuring an intensity of a four-wave mixing light outputted from the optical device to be measured, as a function of a transmission distance of the four-wave mixing light, when the two lights are simultaneously inputted into the optical device to be measured;

a calculating unit for calculating a chromatic dispersion distribution in the optical device to be measured, in accordance with the intensity of the four-wave mixing light as the function of the transmission distance, which is measured by the intensity measurement unit;

a portion specifying unit for specifying a portion of the optical device to be measured in a longitudinal direction of the optical device;

a sign setting unit for setting a correct sign, selected out of a positive sign and a negative sign, to be marked on a chromatic dispersion value in the specified portion of the optical device to be measured; and a sign converting unit for converting an initial sign marked on the chromatic dispersion value in the specified portion, into the correct sign which is set by the sign setting unit, the chromatic dispersion value is extracted from the chromatic dispersion distribution calculated by the calculating unit, wherein the calculating unit calculates a signed chromatic dispersion distribution expressed by marking each chromatic dispersion value with the correct sign, in the optical device to be measured, in accordance with the chromatic dispersion value which is marked with the correct sign into which the initial sign is converted by the sign converting unit.

2. The chromatic dispersion distribution measurement apparatus as claimed in claim 1, wherein the calculating unit calculates an accumulated chromatic dispersion value of the optical device to be measured, in accordance with the calculated signed chromatic dispersion distribution.

3. The chromatic dispersion distribution measurement apparatus as claimed in claim 1, further comprising:

a directional coupler unit for outputting the two lights to the optical device to be measured, and for outputting a reflected four-wave mixing light which is reflected from the optical device to be measured, to the intensity measurement unit, wherein the intensity measurement unit measures the intensity of the reflected four-wave mixing light as the function of the transmission distance.

4. A chromatic dispersion distribution measurement method for measuring a chromatic dispersion distribution in an optical device to be measured, comprising:

emitting two lights which have different wavelengths from each other;

measuring an intensity of a four-wave mixing light outputted from the optical device to be measured, as a function of a transmission distance of the four-wave mixing light, when the two lights are simultaneously inputted into the optical device to be measured;

calculating a chromatic dispersion distribution in the optical device to be measured, in accordance with the measured intensity of the four-wave mixing light as the function of the transmission distance;

specifying a portion of the optical device to be measured in a longitudinal direction of the optical device;

setting a correction sign, selected out of a positive sign and a negative sign, to be marked on a chromatic dispersion value in the specified portion of the optical device to be measured; and converting an initial sign which is marked on the chromatic dispersion value in the specified portion, into the set correct sign, the chromatic dispersion value is extracted from the calculated chromatic dispersion distribution, wherein the calculating is carried out by calculating a signed chromatic dispersion distribution expressed by marking each chromatic dispersion value with the correct sign, in the optical device to be measured, in accordance with the chromatic dispersion value which is marked with the correct sign.

5. The chromatic dispersion distribution measurement method as claimed in claim 4, wherein the calculating is carried out by calculating an accumulated chromatic dispersion value of the optical device to be measured, in accordance with the calculated signed chromatic dispersion distribution.

6. A chromatic dispersion distribution measurement apparatus, comprising:

a portion information obtaining unit for obtaining a portion information which specifies a portion of an optical device to be measured;

a sign information obtaining unit for obtaining a sign information which indicates a correct sign to be marked on a chromatic dispersion value in the specified portion;

a sign converting unit for converting an initial sign marked on the chromatic dispersion value in the specified portion, into the correct sign in accordance with the sign information obtained by the sign information obtaining unit; and a calculating unit for calculating a signed chromatic dispersion distribution expressed by marking each chromatic dispersion value with the correct sign, in the optical device to be measured, in accordance with the chromatic dispersion value marked with the correct sign into which the initial sign is converted by the sign converting unit.

7. The chromatic dispersion distribution measurement apparatus as claimed in claim 6, wherein the calculating unit calculates an accumulated chromatic dispersion value of the optical device to be measured, in accordance with the calculated signed chromatic dispersion distribution.

8. A chromatic dispersion distribution measurement method, comprising:

obtaining a portion information which specifies a portion of an optical device to be measured;

obtaining a sign information which indicates a correct sign to be marked on a chromatic dispersion value in the specified portion;

converting an initial sign marked on the chromatic dispersion value in the specified portion, into the correct sign in accordance with the obtained sign information; and calculating a signed chromatic dispersion distribution expressed by marking each chromatic dispersion value with the correct sign, in the optical device to be measured, in accordance with the chromatic dispersion value marked with the correct sign.

9. The chromatic dispersion distribution measurement method as claimed in claim 8, further comprising:

calculating an accumulated chromatic dispersion value of the optical device to be measured, in accordance with the calculated signed chromatic dispersion distribution.

10. A storage medium having a program recorded thereon, the program is executable by a computer, wherein the program comprises:

a first program code for obtaining a portion information which specifies a portion of an optical device to be measured;

a second program code for obtaining a sign information which indicates a correct sign to be marked on a chromatic dispersion value in the specified portion;

a third program code for converting an initial sign marked on the chromatic dispersion value in the specified portion, into the correct sign in accordance with the obtained sign information; and a fourth program code for calculating a signed chromatic dispersion distribution expressed by marking each chromatic dispersion value with the correct sign, in the optical device to be measured, in accordance with the chromatic dispersion value marked with the correct sign.

11. The storage medium as claimed in claim 10, wherein the program further comprises:

a fifth program code for calculating an accumulated chromatic dispersion value of the optical device to be measured, in accordance with the calculated signed chromatic dispersion distribution.

* * * * *